(12) United States Patent  
White

(10) Patent No.: US 8,079,024 B2  
(45) Date of Patent: *Dec. 13, 2011

(54) METHOD AND SYSTEM FOR PLATFORM-INDEPENDENT FILE SYSTEM INTERACTION

(75) Inventor: Eric White, Austin, TX (US)

(73) Assignee: Open Text S.A., Grand Duchy (LU)

( * ) Notice: Subject to any disclaimer, the term of this patent is extended or adjusted under 35 U.S.C. 154(b) by 17 days.

This patent is subject to a terminal disclaimer.

(21) Appl. No.: 12/703,402

(22) Filed: Feb. 10, 2010

(65) Prior Publication Data

US 2010/0146493 A1 Jun. 10, 2010

Related U.S. Application Data

(63) Continuation of application No. 10/947,868, filed on Sep. 23, 2004, now Pat. No. 7,672,955, which is a continuation of application No. 10/028,232, filed on Dec. 21, 2001, now Pat. No. 6,892,377.

(60) Provisional application No. 60/257,387, filed on Dec. 21, 2000.

(51) Int. Cl.
*G06F 17/30* (2006.01)
*G06F 12/00* (2006.01)
*G06F 9/45* (2006.01)
*G06F 9/54* (2006.01)

(52) U.S. Cl. ............ 717/140; 707/822; 707/E17.01; 711/154; 711/E12.001; 719/328

(58) Field of Classification Search .......... 717/140; 711/154, E12.001; 719/328
See application file for complete search history.

(56) References Cited

U.S. PATENT DOCUMENTS

| | | | |
|---|---|---|---|
| 6,604,182 B1 * | 8/2003 | Sexton et al. | 711/170 |
| 6,640,244 B1 * | 10/2003 | Bowman-Amuah | 709/207 |
| 6,892,377 B1 | 5/2005 | White | |
| 6,901,554 B1 * | 5/2005 | Bahrs et al. | 715/210 |
| 7,100,195 B1 * | 8/2006 | Underwood | 726/2 |
| 7,146,369 B2 | 12/2006 | White | |
| 7,194,506 B1 | 3/2007 | White | |
| 7,672,955 B2 | 3/2010 | White | |

OTHER PUBLICATIONS

Office Action in U.S. Appl. No. 09/931,228, mailed Mar. 17, 2005, 18 pgs.
Office Action in U.S. Appl. No. 09/931,228, mailed Aug. 26, 2005, 22 pgs.

(Continued)

*Primary Examiner* — Shyue Jiunn Hwa
(74) *Attorney, Agent, or Firm* — Sprinkle IP Law Group

(57) ABSTRACT

Embodiments disclosed can provide a simple, singular programmatic interface for application developers to access and manipulate ASCII and non-ASCII file specifications in a cross-platform development environment regardless of operating system encoding capabilities or of the nature of the original file specification encoding. An application development environment is configured on a computer system such that a magic class file string object is instantiated when a bit string of a first encoding is received. The bit string represents a file specification of a file containing application code written by an application developer. The magic class file string object automatically determines what target operating system is being called by a function call in the application code, automatically transcodes the bit string from the first encoding into a second encoding of the target operating system, and automatically makes a correct file system API call specific to the target operating system.

15 Claims, 2 Drawing Sheets

OTHER PUBLICATIONS

Office Action in U.S. Appl. No. 09/931,228, mailed Mar. 14, 2006, 23 pgs.
Office action in U.S. Appl. No. 10/027,384, mailed Mar. 31, 2005, 5 pgs.
Office action in U.S. Appl. No. 10/027,384, mailed Oct. 5, 2005, 7 pgs.
Office Action in U.S. Appl. No. 10/931,248, mailed Feb. 17, 2005, 9 pgs.
Office Action in U.S. Appl. No. 10/931,248, mailed Aug. 17, 2005, 12 pgs.
Examiner's Answer in U.S. Appl. No. 09/931,228, mailed Jul. 2, 2007, 32 pgs.

* cited by examiner

METHOD AND SYSTEM FOR PLATFORM-INDEPENDENT FILE SYSTEM INTERACTION

CROSS-REFERENCE TO RELATED APPLICATIONS

This application is a continuation of, and claims a benefit of priority under 35 U.S.C. 120 of the filing date of U.S. patent application Ser. No. 10/947,868 by inventor Eric White, entitled "METHOD AND SYSTEM FOR PLATFORM-INDEPENDENT FILE SYSTEM INTERACTION," filed on Sep. 23, 2004, now U.S. Pat. No. 7,672,955, which is a continuation of, and claims a benefit of priority under 35 U.S.C. 120 of the filing date of U.S. patent application Ser. No. 10/028,232 by inventor Eric White, entitled "METHOD AND SYSTEM FOR PLATFORM-INDEPENDENT FILE SYSTEM INTERACTION," filed on Dec. 21, 2001, issued as U.S. Pat. No. 6,892,377, which in turn claims the benefit of priority under 35 U.S.C. §119 to Provisional Application No. 60/257,387, filed on Dec. 21, 2000, entitled "AN AUTOMATIC LOCALE DETECTION SYSTEM AND METHOD." All applications referenced in this paragraph are hereby expressly incorporated by reference herein for all purposes.

TECHNICAL FIELD OF THE INVENTION

This invention relates generally to the operation of client server computer networks. More particularly, the present invention relates to methods and systems for interfacing with an operating system file space. Even more particularly, the present invention relates to a method and system for platform-independent file system interaction that can provide a singular programmatic interface for developers to access and manipulate file specifications regardless of operating system encoding capabilities or the nature of an original specification encoding.

BACKGROUND OF THE INVENTION

When developing applications for computer system implementation, such as within a client-server computer network, developers must make system calls to the file system of an underlying operating system with which they are working. Such system calls to the operating system file structure may comprise calls to manipulate the operating system's directory structure or to open an individual file. These system calls must adhere to an operating system recognized specification, including the file path and the file name of the content that is being requested by the call. The underlying operating system's application program interfaces ("APIs") typically only handle pre-defined types of system calls and query strings. For example, standard operating system APIs can typically only process ASCII (American Standard Code for Information Interchange) encoded data as parameters to system calls.

The default encoding implementation in most system libraries is pure ASCII, and only recently have changes been made, for example, to the Microsoft Windows and standard Unix APIs to accept non-ASCII characters in a file specification. However, in the Windows environment, the use of non-ASCII characters in a file specification requires a separate API (a separate function call). Thus, to pass a non-ASCII file specification to a Windows system, a developer must make an additional and completely different function call than that used for ASCII characters.

Non-ASCII encoding specifications are often categorized under the heading of Unicode. Unicode methods are function calls within an operating system API that allow the API to accept Unicode character specifications, as opposed to ASCII character specifications. Operating systems process Unicode calls in a variety of different manners. For example, in Unix, the function calls for ASCII and Unicode character specifications are the same, and Unix can accept, for example, a UTF-8 encoded string rather than just an ASCII string. "UTF-8" stands for UCS Transformation Format, 8-bit, and "UCS" stands for Universal Character Set. UCS is an explicit name for the character specifications typically called Unicode. Thus, UTF-8 encoding is basically an 8-bit transmission format for Unicode. The ASCII specification is also an eight bit format, though characters employing the $8^{th}$ ("high-order") bit are often known as "extended ASCII" characters.

In some operating systems, such as Unix, it is thus easier than in others, such as Windows, to make non-ASCII character specification functions calls. This is because, for example, in Unix, the same function call can be made for a non-ASCII Unicode character specification as for an ASCII character specification, and the query string is automatically transformed to UTF-8 encoding. In Windows, on the other hand, the actual file specification must be encoded separately into a Unicode encoding, such as UCS-2 (Universal Character Set 2-byte), and a different function call must be made. Thus, in cross-platform development environments, developers must typically explicitly code their applications to deal with the problems associated with passing non-ASCII file specifications to an operating system's file system. In prior art cross-platform application development systems and methods, developers typically have to write programmatically wrapped code that will execute differently (different calls will be made) depending on whether the developer is building an application for, for example, a Windows environment, or for a Unix environment, or other operating system environment. The result of these prior art methods and systems is that developers end up duplicating their efforts by writing cluttered code with split functionality to ensure that file system function calls will execute properly for each operating system environment they expect to encounter. The resulting application code can be lengthy, duplicative, and thus, inefficient.

A developer's programmatic interface to an operating system's file space must thus be able to handle non-ASCII file specifications in a cross-platform development environment. The file path (absolute or relative), including the directory hierarchy and the leaf node file name itself, can be non-ASCII, and thus there must be a means in place for handling non-ASCII file specifications. Currently, the encoding of non-ASCII file specifications and the encoding capabilities of the underlying file system API (at the operating system level) must be handled programmatically by the developer. Each operating system maintains different encoding interfaces for file system interaction, forcing developers to make operating system appropriate function calls when interacting with that operating system's file space. This results in unwieldy, cluttered and unnecessarily duplicative and complicated code writing for developers.

SUMMARY OF THE INVENTION

Therefore, there is a need for a method and system for platform-independent file system interaction that can provide an application developer the capability to interface with an operating system's file system in a singular manner that is seamless and transparent to the developer regardless of the underlying operating system.

Further, a need exists for a method and system for platform-independent file system interaction that can automatically determine an operating system's file system API capabilities and provide a simple, singular programmatic interface for developers to access and manipulate file system specifications regardless of operating system encoding capabilities or of the nature of an operating system's file specification encoding.

In accordance with the present invention, a method and system for platform-independent file system interaction are provided that substantially eliminate or reduce the disadvantages associated with prior art methods and systems for cross-platform application development interactions with an operating system's file system.

More specifically, the present invention provides a method and system for platform-independent file system interaction that can abstract the system-level idiosyncrasies associated with multi-platform, multi-language, multi-encoding file system interactions. One embodiment of the method of this invention can comprise instantiating a string object via a development environment coded calling process and setting a file name and a file path, having an easily-identifiable format, for the string object with the calling process. The string object can determine the encoding of the file name and the file path and the calling process can forward the string object and an associated file operation to an operating system level file system interface handler. The operating system level file system interface handler can call an operating system naming function to format the string object. The string object naming function can be compiled along with an encoding marker indicating the target operating system for the desired file operation. The file name and the file path can be transcoded, based on the encoding marker value, to the encoding of the target operating system. The transcoded file name and file path can be returned to the development environment (e.g., to a developer's application) by the string object naming function. The operating system level file system interface handler can then execute the file operation.

A technical advantage of the method and system for platform-independent file system interaction of the present invention is that it can provide an application developer the capability to interface with an operating system's file system in a singular manner that is seamless and transparent to the developer regardless of the underlying operating system.

Another technical advantage of the method and system of this invention is that it can automatically determine an operating system's file system API capabilities and provide a simple, singular programmatic interface for developers to access and manipulate file system specifications regardless of operating system encoding capabilities or of the nature of the original file specification encoding.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein.

DETAILED DESCRIPTION OF THE INVENTION

Figure 1:
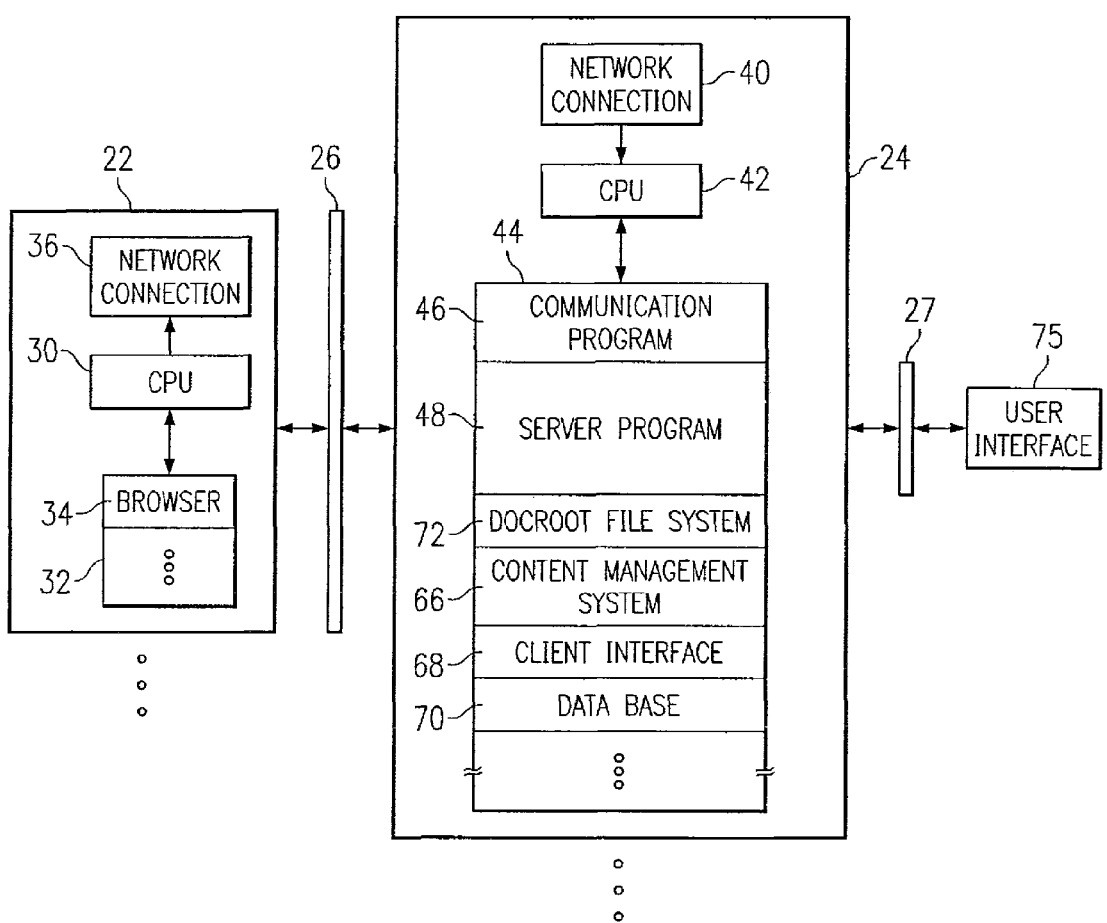
FIG. 1 is a simplified block diagram illustrating a client server computer network 20 that may be used to implement an embodiment of the method and system of the present invention.

Preferred embodiments of the present invention are illustrated in the FIGUREs, like numerals being used to refer to like and corresponding parts of the various drawings.

Embodiments of the method and system of the present invention provide application developers with a means to automatically determine a file system's API capabilities and provide a simple, singular programmatic interface for developers to access and manipulate file specifications regardless of the operating system encoding capabilities or of the nature of the operating system's file specification encoding. Embodiments of the method and system of this invention can be implemented together with the inventions disclosed in related U.S. patent application Ser. No. 09/965,914, filed on Sep. 28, 2001, entitled "METHOD AND SYSTEM FOR CACHE MANAGEMENT OF DYNAMICALLY-GENERATED CONTENT" (the "Cache Management Application"), U.S. patent application Ser. No. 09/931,228, filed on Aug. 16, 2001, entitled "METHOD AND SYSTEM FOR DETERMINING A NETWORK USER'S LOCALE" (the "Locale Detection Application"), U.S. patent application Ser. No. 10/027,383, filed on Dec. 21, 2001, now U.S. Pat. No. 6,850,941, entitled "METHOD AND SYSTEM FOR NATIVE-BYTE FORM HANDLING," and U.S. patent application Ser. No. 10/027,384, filed on Dec. 21, 2001, now U.S. Pat. No. 7,194,506, entitled "METHOD AND SYSTEM FOR CACHE MANAGEMENT OF LOCALE-SENSITIVE CONTENT." These applications are hereby incorporated by reference in their entirety.

Embodiments of the method and system of this invention can provide application developers the capability to do away with the multiple separate function calls that previously have had to be programmed into an application to ensure compatibility with the underlying computer system's operating system and file system capabilities. The embodiments of this invention can instead provide developers the capability to interface (via a singular interface) to a predefined "magic class" string specification, which can be the same regardless of the operating system platform for which a developer is writing an application. The embodiments of the present invention can comprise a string-encoding class that application developers can interface with in the same manner, regardless of the underlying operating system. The string-encoding class of the embodiments of this invention does not have to be precompiled separately and can receive incoming bit strings and automatically transcode them to the encoding of a developer's target operating system.

In a manner transparent to the developers, incoming bit strings are received as inputs by the magic class string which can then automatically determine the operating system that is being called. The magic class string can then encode (transform) the bit string with the appropriate operating system encoding, such as UCS-2 or UTF-8. Embodiments of the magic class string of the present invention can thus take a bit string in one encoding, transform it into a second encoding, and then automatically make the correct file system API call, whether the underlying operating system is a Unix system, a Windows system, or other operating system. In this way, embodiments of the method and system of this invention can provide developers with a platform, compiler, and string formatting independent interface for application development.

Embodiments of the magic class string encoding of the method and system of this invention can comprise a C++ software applet that can be compiled separately and that can be called in a transparent manner to instantiate an object of the strings encoding class for a developer to use. The magic class string encoding of the embodiments of this invention can be used with caching and server systems and methods such as those disclosed in the Cache Management Application and the Locale Detection Application. An application development environment on a computer system implementing an embodiment of the method and system of this invention can be configured such that when a bit string of one encoding is received, a magic class file string object is instantiated to transcode the bit string in a manner as described herein. A magic class object representing a bit string encoded using an embodiment of this invention can thus be passed to a development environment for processing or other manipulation. When the file associated with the bit string is to be written to disk, the magic class object representing the file can be forwarded to the operating system's file system to initiate the writing to disk.

The naming formatting of the magic class string and object can be an arbitrarily determined format, so long as the format is consistent and easily recognizable by the development environment. For example, the magic class file string can comprise the name "VGNI18N" as a predetermined portion of the file string format so that the file string name format can be easily recognized by the development system. Embodiments of the method and system of this invention can comprise a library through which all system input/output requests are processed by manipulating the magic class file string objects. Once a developer has written code for an application, he or she can include an indicator of the encoding of the operating systems for which the application is intended into the magic class file string. The operating system encoding can be indicated by a set of conditional logic; i.e., the capabilities of each operating system must be known to the developer in advance and programmed a priori by the developer. The magic class file string format of the embodiments of this invention can typically be used within a library, and the library system can be conditionally compiled (by operating system platform) to capture the requisite code snippets for inclusion in the library. Preprocessor statements can be used for this purpose.

Embodiments of the magic class file string of the method and system of this invention can also sit on top of a library such that all file system input/output requests are handled by manipulation of and instantiation of the file string class (e.g., a class object). Inside of each instantiation of a class object, a developer can include a small amount of code that sets an indicator at compile time. This is because, depending on the operating system, code written for that operating system will require, at compile time, the turning on of different switches to link to different libraries. Therefore, these small code pieces are programmed by a developer such that at compile time the code can automatically determine, based on conditional logic, on which operating system it is being compiled. This conditional logic (e.g., an "if" task) can be used to determine which API calls (operating system specific) should be made.

The encoding (magic class) objects of the embodiments of this invention can also perform dynamic string transcoding. In other words, if the magic class object is handed a string encoded in, for example, UTF-8, but the operating system of the underlying computer system is actually a Windows operating system, the class object can dynamically transcode from the UTF-8 encoding to a UCS-2 encoding and forward the UCS-2 encoded string to the Windows operating system. In this way, proper file system interactions can be performed regardless of the underlying operating system. The same operations can occur regardless of the operating system, such that, for example, if a UCS-2 string is provided and the application is running on a Unix system, the embodiments of this invention can transcode from UCS-2 encoding to UTF-8 encoding and hand the new UTF-8 string to the Unix operating system. It is contemplated that any operating system encodings can be transcoded using embodiments of the class object of the method and system of this invention so long as the operating system's encoding subsystem capabilities are known to the developer coding an application. For example, the Apple Macintosh and Linux operating systems can also be supported.

The embodiments of the method and system of this invention can be instantiated by a function call from within a developer's application code. Embodiments of the method and system of this invention can be implemented within any existing computer system having libraries that can be called by developers. The embodiments of the method and system of this invention can also comprise a library that can be called by applications. For example, an octet stream, representing a file specification, can be passed to the constructor of a magic class file string in accordance with the embodiments of this invention, along with an indication of the octet stream's encoding (e.g., using standard ISO and commercially accepted encoding names). The magic class object of the embodiments of this invention can then translate the octet from an original encoding into a Unicode representation of the same information.

FIG. 1 is a simplified block diagram illustrating a client server computer network 20 that may be used to implement an embodiment of the method and system of the present invention. Network 20 can include at least one client computer 22 and at least one server computer 24. Client computer 22 and server computer 24 can be connected by a transmission channel 26, which may be any wire or wireless transmission channel, including a fiber optic transmission channel. Client computer 22 can be a standard computer including a central processing unit ("CPU") 30 connected to a memory (primary and/or secondary) 32. As known to those in the art, RAM, ROM, magnetic storage devices, hard drives are examples of computer readable storage media. Memory 32 can comprise any combination of RAM, ROM and/or a magnetic storage device such as a hard drive. Memory 32 can store one or more computer programs, including a web browser 34, as known to those in the art. Web browser 34 can be used to communicate with remote server computers 24 and to visually present information received from server computers 24. Client computer 22 can establish network communications through a standard network connection device 36. Network connection device 36 can be any network connection device as known to those in the art.

Server computer 24 can include standard server computer components, including a network connection device 40, a CPU 42, and a memory (primary and/or secondary) 44. Network connection device 40, CPU 42 and memory 44 can be equivalent components to network connection device 36, CPU 30 and memory 32 of client computer 22. Memory 44 can store a set of computer programs (computer-executable software instructions) to implement the processing associated with this invention. As shown in FIG. 1, memory 44 can store a standard communication program 46 to realize standard network communication. Memory 44 can also store a standard server program 48. Server program 48 can be a standard HTTP software web server program, such as NCSA from the National Center for Supercomputing Applications, Champaign, Ill., or Apache3 from Apache HTTP Server Program, Lincoln, Nebr.

Memory 44 can also store a content management system (CMS) 66 and a database 70, that together can be used to create, test, modify, manage and store content that can be made available to server program 48. Content management system 66 can also be used to manage metadata associated with cached content that can be stored and accessed through docroot file system 72. Client interface program 68 is associated with and interfaces with CMS 66. Client interface program 68 can be the interface program to CMS 66 for developing templates for content. Client interface program 68 can also be used for modifying and deleting these content templates. Database 70 can be stored within memory 44 of server 24 or at another server location. Database 70 can be a standard relational database. Database 70 can be used to store libraries in which the embodiments of this invention can be implemented.

Client interface program 68 can be a Java-based interface and can be stored on memory 44 of server 24 or at another server location. Client interface program 68 can be called via user interface 75, which is communicatively connected to server 24 (or to any other server on which client interface program 68 is stored) by second transmission channel 27. User interface 75 can be a graphical user interface accessed by a keyboard and/or mouse and viewed on a computer monitor. User interface 75 can also be any other user-to-computer interface as known to those in the art. User interface 75 can be situated locally or remotely to server 24. User interface 75 can call client interface program 68 (i.e., access the server storing interface program 68) over transmission channel 27. Transmission channel 27 can be a direct connection or a network connection such as an Internet connection. User interface 75 can be used by application developers to implement code and can comprise the physical interface to the simple, singular programmatic interface of the embodiments of this invention for developers to access and manipulate file specifications.

Figure 2:
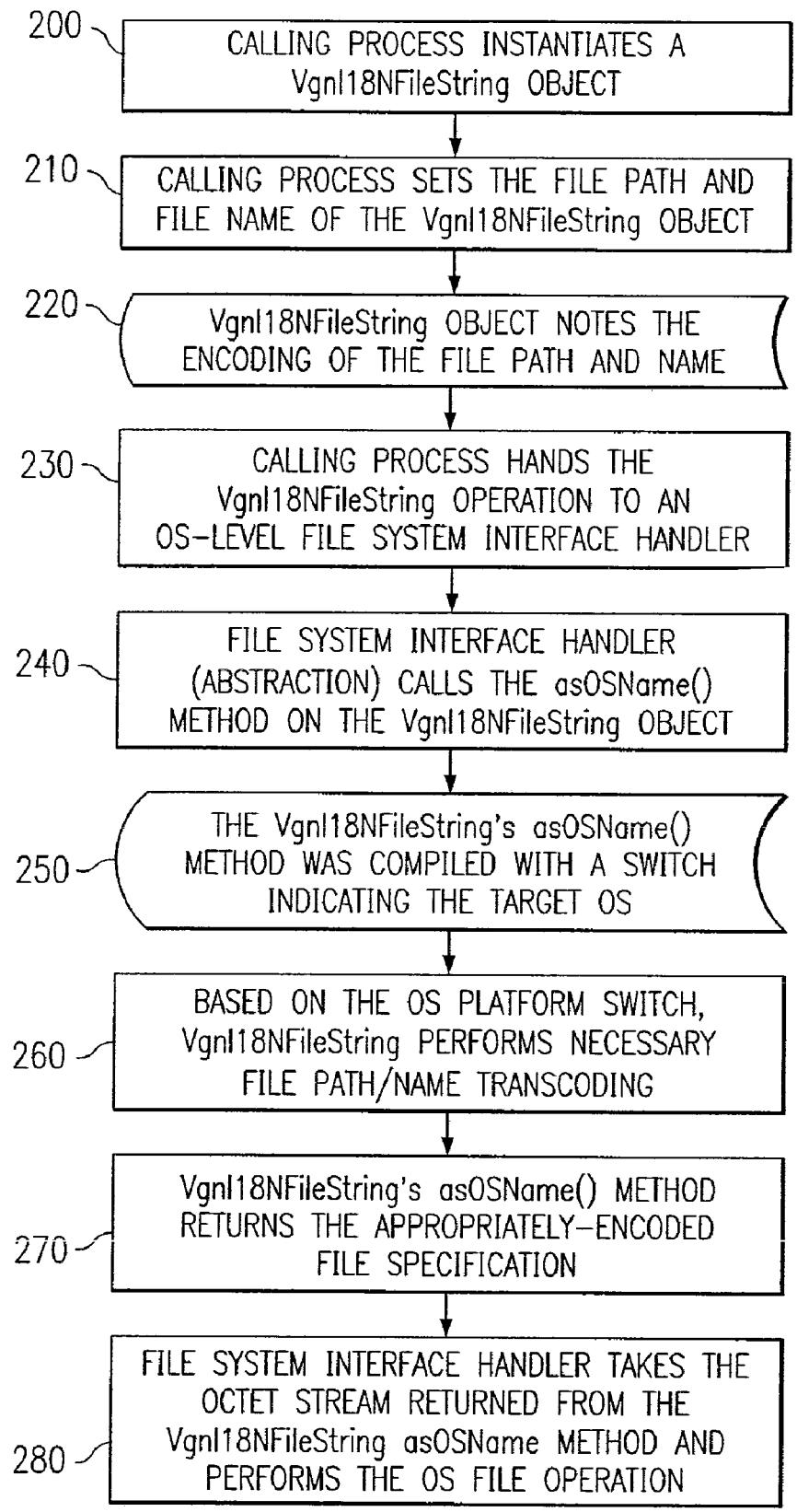
FIG. 2 is a flowchart diagram illustrating the operation of an embodiment of the magic class string object of the method and system of this invention.

FIG. 2 is a flowchart diagram illustrating the operation of an embodiment of the magic class string object of the method and system of this invention. At step 200, a developer's coded calling process within an application instantiates a string object (e.g., a magic class string object). Once a string object has been instantiated at step 200, at step 210 the calling process sets a file path and file name for the string object. The file path and string name format can be any arbitrarily selected format, so long as the format can be easily identified and is consistent throughout an application. At step 220, the instantiated string object can determine the encoding of the file path and name that has been passed to it and with which it is now associated. This encoding can be, for example, a Windows-based encoding, a Unix-based encoding, or the encoding of any other such operating system as known to those in the art.

Once a string object has determined the encoding of the file path and name, at step 230 the calling process can hand the string object and an associated operation to an operating system level file system interface handler. This operating system level file system interface handler can interface with the magic class string object of the embodiments of this invention as a back-end system, such that, to a developer, the encoding and transcoding of a string for file operations are transparent. At step 240, the file system interface handler can call an operating system naming function (e.g., asOSName) to operate on (e.g., name or format) the now encoded magic class string object. At step 250, the magic class string object asOSName function is compiled along with a switch marker indicating the target operating system for the file interaction. At step 260, based on the operating system platform switch, the magic class string object of the embodiments of this invention can perform the necessary file path/name transcoding to the target operating system's encoding, for example, to UCS-2 or UTF-8. At step 270, the string object's asOSName function returns the appropriately encoded file specification to the developer's application and then, at step 280, the operating system file system interface handler can take the octet stream returned from the string object asOSName function and perform the requested operating system file operation. In this way, developers can develop applications that can instantiate magic class string objects to dynamically transcode file operations from one encoding used by the developer to a second encoding required by the operating system for which a file operation is targeted.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

What is claimed is:

1. A method for accessing and manipulating file specifications in a cross-platform development environment, comprising:
   in an application development environment on a computer system, instantiating a magic class file string object to represent a bit string;
   determining a first encoding of a file name and file path associated with the magic class file string object, wherein the magic class file string object performs the determining, wherein the magic class file string object contains pieces of code programmed to make one or more automatic determinations at compile time, wherein the bit string represents a file specification of a file, wherein the file contains application code, and wherein the application code comprises a function call;
   automatically determining a target operating system that is being called by the function call, wherein the magic class file string object performs the automatic determining;
   automatically transcoding the file name and file path from the first encoding into a second encoding of the target operating system, wherein the magic class file string object performs the automatic transcoding; and
   automatically making a file system application program interface (API) call specific to the target operating system, wherein the magic class file string object performs the automatic API call and wherein the pieces of code comprise a set of conditional logic for determining which one or more file system specific API calls are to make.

2. The method according to claim 1, wherein the file specifications include American Standard Code for Information Interchange (ASCII) encoded file specifications and non-ASCII encoded file specifications.

3. The method according to claim 1, wherein the automatically determining further comprises automatically determining the target operating system's file system API capabilities.

4. The method according to claim 1, further comprising:
   forwarding the magic class file string object to the target operating system's file system to initiate a write to disk when the file associated with the bit string is to be written to disk.

5. The method according to claim 1, wherein the pieces of code comprise an instruction for turning on at compile time a switch to link to a library through which all system input/output requests are processed.

6. A computer program product comprising at least one non-transitory computer readable storage medium storing instructions translatable by a processor to perform:
in an application development environment on a computer system, instantiating a magic class file string object to represent a bit string;
determining a first encoding of a file name and file path associated with the magic class file string object, wherein the magic class file string object contains pieces of code programmed to make one or more automatic determinations at compile time, wherein the bit string represents a file specification of a file, wherein the file contains application code, and wherein the application code comprises a function call;
automatically determining a target operating system that is being called by the function call;
automatically transcoding the file name and file path from the first encoding into a second encoding of the target operating system; and
automatically making a file system application program interface (API) call specific to the target operating system, wherein the pieces of code comprise a set of conditional logic for determining which one or more file system specific API calls are to make.

7. The computer program product of claim 6, wherein the file specifications include American Standard Code for Information Interchange (ASCII) encoded file specifications and non-ASCII encoded file specifications.

8. The computer program product of claim 6, wherein the instructions are further translatable by the processor to automatically determine the target operating system's file system API capabilities.

9. The computer program product of claim 6, wherein the instructions are further translatable by the processor to forward the magic class file string object to the target operating system's file system to initiate a write to disk when the file associated with the bit string is to be written to disk.

10. The computer program product of claim 6, wherein the pieces of code comprise an instruction for turning on at compile time a switch to link to a library through which all system input/output requests are processed.

11. A system, comprising:
a computer system running an application development environment and having at least one non-transitory computer readable storage medium and a processor, wherein the at least one computer readable storage medium stores instructions translatable by the processor to perform:
instantiating a magic class file string object to represent a bit string;
determining a first encoding of a file name and file path associated with the magic class file string object, wherein the magic class file string object contains pieces of code programmed to make one or more automatic determinations at compile time, wherein the bit string represents a file specification of a file, wherein the file contains application code, and wherein the application code comprises a function call;
automatically determining a target operating system that is being called by the function call;
automatically transcoding the file name and file path from the first encoding into a second encoding of the target operating system; and
automatically making a file system application program interface (API) call specific to the target operating system, wherein the pieces of code comprise a set of conditional logic for determining which one or more file system specific API calls are to make.

12. The system of claim 11, wherein the file specifications include American Standard Code for Information Interchange (ASCII) encoded file specifications and non-ASCII encoded file specifications.

13. The system of claim 11, wherein the instructions are further translatable by the processor to automatically determine the target operating system's file system API capabilities.

14. The system of claim 11, wherein the instructions are further translatable by the processor to forward the magic class file string object to the target operating system's file system to initiate a write to disk when the file associated with the bit string is to be written to disk.

15. The system of claim 11, wherein the instructions comprise an instruction for turning on at compile time a switch to link to a library through which all system input/output requests are processed.

* * * * *